(12) United States Patent
Wicks et al.

(10) Patent No.: US 6,204,797 B1
(45) Date of Patent: Mar. 20, 2001

(54) WAVEFORM DIVERSITY FOR SPATIAL-TEMPORAL DENIAL OF RADAR AND COMMUNICATION SYSTEM

(75) Inventors: Michael C. Wicks, Utica, NY (US); Scott M. Bolen, Laurel, MD (US); Russell D. Brown, Holland Patent, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/330,928

(22) Filed: Jun. 11, 1999

(51) Int. Cl.[7] ....................................................... G01S 7/36
(52) U.S. Cl. ........................................................... 342/13
(58) Field of Search ............................................. 342/13–19

(56) References Cited

U.S. PATENT DOCUMENTS 4,580,139 * 4/1986 Weathers et al. ...................... 342/13

* cited by examiner

*Primary Examiner*—Daniel T. Pihulic
(74) *Attorney, Agent, or Firm*—Harold L. Burstyn (57) ABSTRACT

Spatial-temporal waveform diversity methods vary or modulate the far-field radiated waveform of a radar and/or communication antenna as a function of look direction (sidelobe structure). Radar detection performance and angle of arrival estimation are enhanced to deny a coherent reference to non-cooperative bistatic radars and coherent repeater jammer systems. In the most general case, the spatial-temporal modulated waveform varies as a function of angle, based upon the principles of multi-dimensional Fourier synthesis. Spatial-temporal denial is achieved with as few as two auxiliary antennas bracketing a main antenna. The same methods for spatial-temporal waveform diversity can also embed communications signals into the transmitted radar waveform for one-way simulcast of both waveform types. These same directionally dependent simulcast waveforms can incorporate navigation signals for enhanced precision engagement.

18 Claims, 8 Drawing Sheets

WAVEFORM DIVERSITY FOR SPATIAL-TEMPORAL DENIAL OF RADAR AND COMMUNICATION SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates to radar applications, and, in particular, to waveform diversity methods that enhance radar performance and/or prevent unauthorized utilization of emissions that result from the application of bistatic technology to radar and communication systems.

Applying bistatic technology to radar can lend itself to impermissible use of sidelobe emissions through unfriendly or unauthorized detection and tracking of targets. Prior efforts at controlling radar signatures have focused on developing ultra-low sidelobe antennas. Prior-art methods attempt to defeat signal acquisition by affecting the temporal aspect of sidelobe energy. Although sidelobe masking has shown some success in defeating non-cooperative bistatic operation, sophisticated systems can still use sidelobe energy to decode and eventually detect radar transmission signals.

What is needed is to increase traffic in multiple access schemes (e.g., a greater opportunity to reuse frequencies in space-division multiple access) while maintaining the security aspects of a transmitted radar waveform. In communications systems the benefits of waveform diversity are similar to those in simple radar systems. Preventing the acquisition and manipulation of signals is key to maintaining communication security.

SUMMARY OF THE INVENTION

Spatial waveform manipulation is the alteration of a signal's sidelobe waveform so that it differs from that of the mainlobe signal. Unlike temporal manipulation, where a sidelobe's signature is merely obscured, spatial manipulation can change the information contained within a signal with respect to the main beam. Although spatial manipulation alone of a waveform would make it more difficult to decipher than temporal manipulation, a prominent radar sidelobe is still problematic, as its signature can still be acquired. The present invention eliminates this possibility by joint spatial-temporal modulation.

The present invention diversifies radar and/or communication signal signatures by modulating the spatial and temporal attributes of a transmitted waveform in the main beam differently from its sidelobes. This diversification accomplishes three objectives. First, a non-cooperative receiver intercepting sidelobe energy observes a signal that is devoid of information contained in the main beam response. Second, since multipath signals no longer cohere to the main beam signal, channel fading and scintillation are mitigated (this is also true for the radar application). Third, sidelobe suppression is enhanced, since sidelobe signals can be more readily recognized and separated from the response from the main beam. Further, angle of arrival estimates are no longer subject to extreme error from multiple paths. This result also makes the present invention useful for precision navigation (i.e., an improved global positioning system ("GPS")).

The present invention allows monostatic radars and communications systems to operate while it eliminates the interception of sidelobe energy and its exploitation for non-cooperative applications, including bistatic radar and wireless communications transmission. Modem radar systems typically require 40–60 dB of sub-clutter visibility ("SCV") for operation (Skolnik). The present invention limits the adversary's SCV on conventional targets to less than 10 dB and on weak targets to well under 10 dB. Specific calculations show that SCV can be limited, in fact, to 1.58 dB, where SCV is defined as the ratio of the signal plus interference before filtering to the signal plus interference after filtering.

Additionally, embedded communications (a new type of multiple access) and precision navigation signals may now be impressed upon the radiated waveform of an otherwise classically designed radar or communications system.

In communications systems the present invention can mitigate multi-path transmission problems, suppress sidelobes, and provide for highly accurate estimates of angle of arrival. The present invention thus enhances existing multiple access systems (e.g., Space-Division Multiple Access) by allowing greater reuse of frequencies, thereby increasing capacity for traffic.

Briefly stated, the present invention uses spatial-temporal waveform diversity methods to vary or modulate the far-field radiated waveform of a radar and/or communication antenna as a function of look direction (sidelobe structure). Radar detection performance and angle of arrival estimation are enhanced to deny a coherent reference to non-cooperative bistatic radars and coherent repeater jammer systems. In the most general case, the spatial-temporal modulated waveform varies as a function of angle, based upon the principles of multi-dimensional Fourier synthesis. Spatial-temporal denial is achieved with as few as two auxiliary antennas bracketing a main antenna. The same methods for spatial-temporal waveform diversity can also embed communications signals into the transmitted radar waveform for one-way simulcast of both waveform types. These same directionally dependent simulcast waveforms can incorporate navigation signals for enhanced precision engagement.

According to an embodiment of the invention, a method of substantially preventing the interception of information associated with radar or communication waveforms that comprise a main signal and a plurality of sidelobe signals comprises: (a) manipulating a spatial waveform to cause sidelobe signals to differ from a mainlobe signal; and (b) manipulating a temporal waveform through sidelobe signal time-domain encoding to reduce sidelobe signal signature.

According to a feature of the invention, a method of substantially preventing the acquisition and use of radar or communication waveforms that comprise a main signal and a plurality of sidelobe signals comprises: (a) manipulating signatures of the plurality of sidelobe signals through temporal manipulation of waveforms of the plurality of sidelobe signals, thereby causing substantial difficulty in signal acquisition; and (b) manipulating information contained within the plurality of sidelobe signals with respect to the main signal through spatial waveform manipulation, thereby causing substantial difficulty in signal deciphering.

According to another feature of the invention, apparatus for denying the acquisition and use of radar or communication waveforms that comprise a main signal and a plurality of sidelobe signals comprises a multichannel transmit antenna system that further comprises at least two sidelobe antenna elements carrying spatial-temporal sidelobe information to accompany the transmission of a main antenna carrying said main signal.

These and many other objects and advantages of the present invention will be readily apparent to one skilled in the pertinent art from the following detailed description of a preferred embodiment of the invention and the related drawings, in which like reference numerals designate the same elements.

DESCRIPTION OF THE PREFERRED EMBODIMENTS

Figure 1:
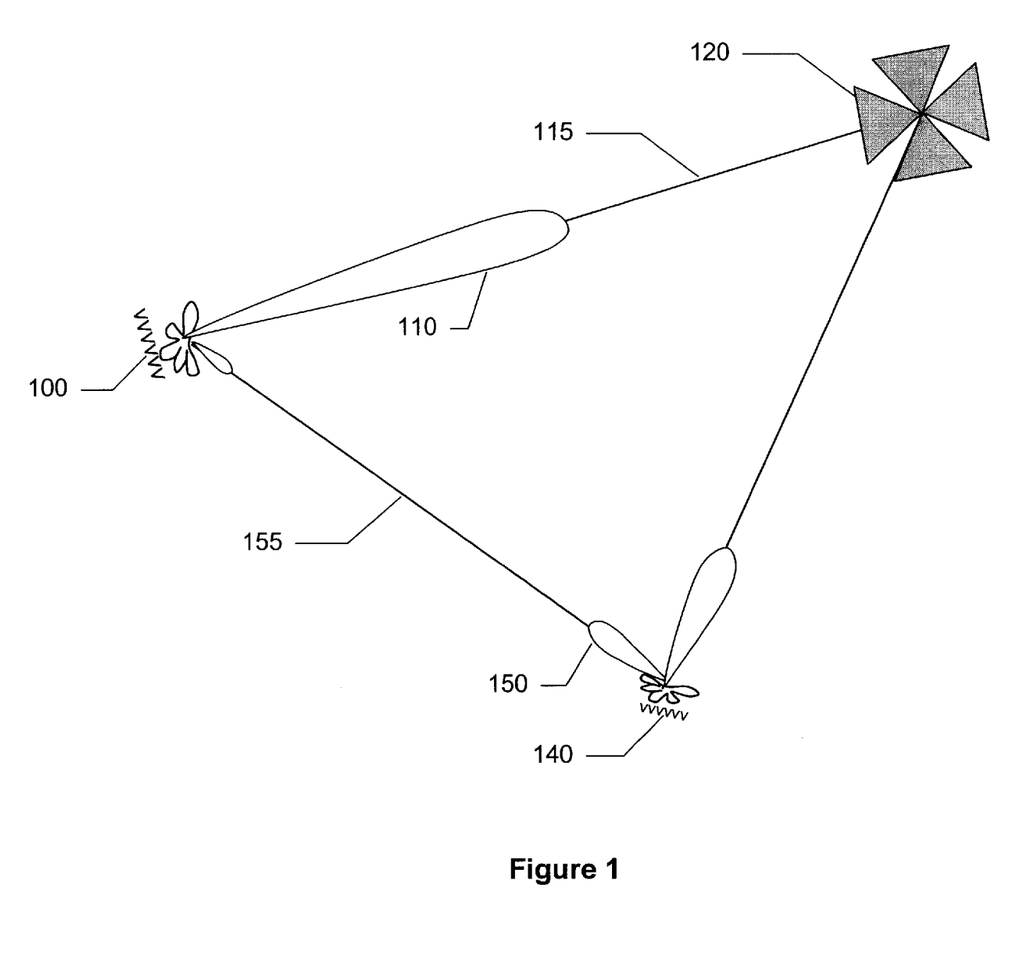
FIG. 1 shows a geometry within which the present invention can be implemented.

FIG. 1 illustrates a geometry the present invention was designed to enhance. The radar geometry has a wide angular separation between a monostatic direct path 115 to a target 120 and a path 155 to a non-cooperative bistatic receiver 140. For non-cooperative bistatic radar 140 to detect returns from target 120 in the presence of clutter, a coherent reference signal 150 is required. If reference signal 150 is modulated to be different from a main beam signal 110 transmitted from a radar transceiver 100, then coherent signal processing, including filtering to reject clutter, cannot be achieved. Thus the large clutter residue masks all but the strongest target returns.

Figure 2:
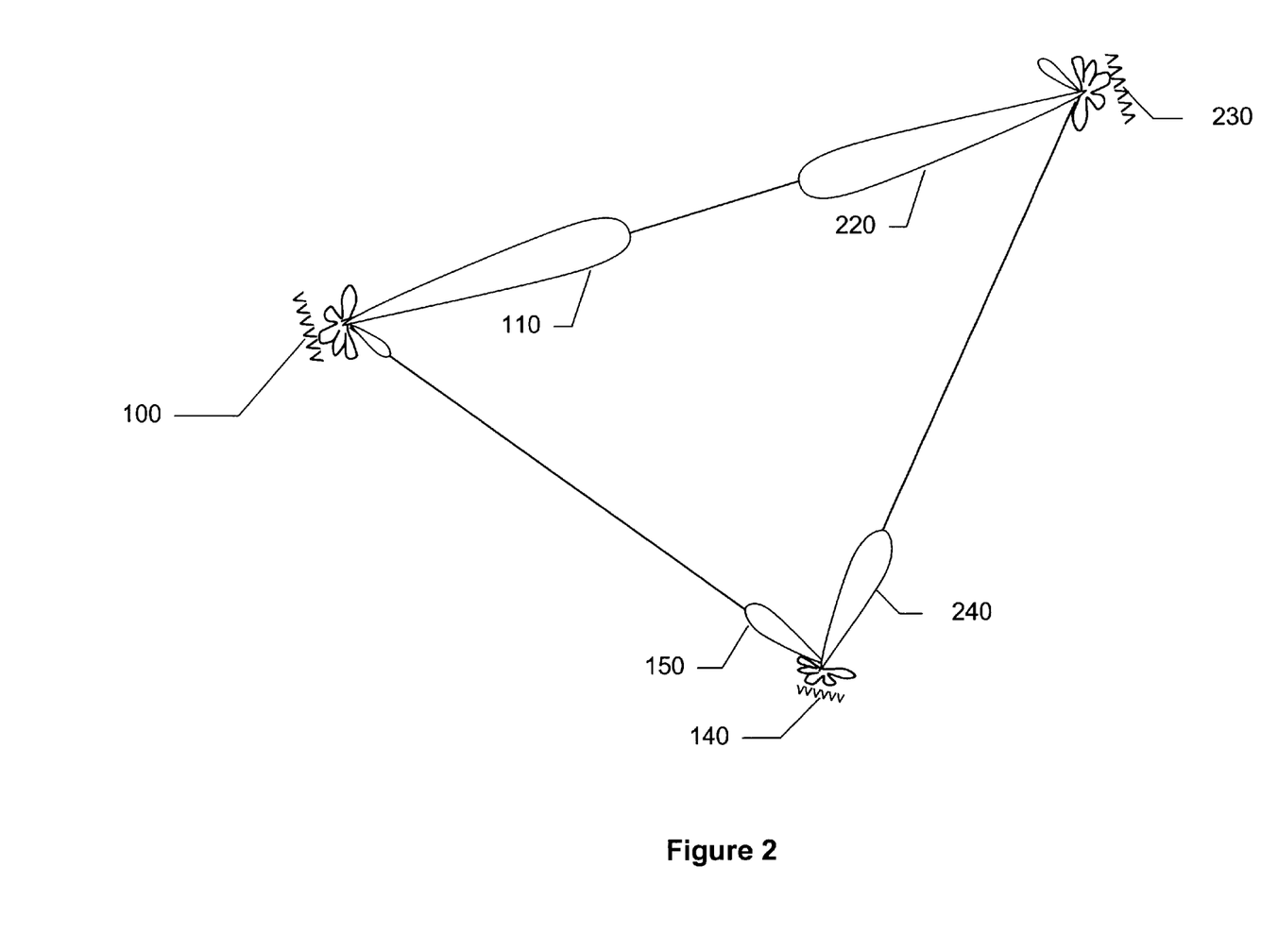
FIG. 2 shows a geometry for which the present invention prevents a non-cooperative receiver from intercepting sidelobe emissions from transceivers.

FIG. 2 illustrates a geometry for which the present invention denies non-cooperative bistatic receiver 140 the capacity to intercept sidelobe emissions from radar transceiver 100 and second radar transceiver 230. Non-cooperative receiver 140 has a main lobe 240.

Figure 3:
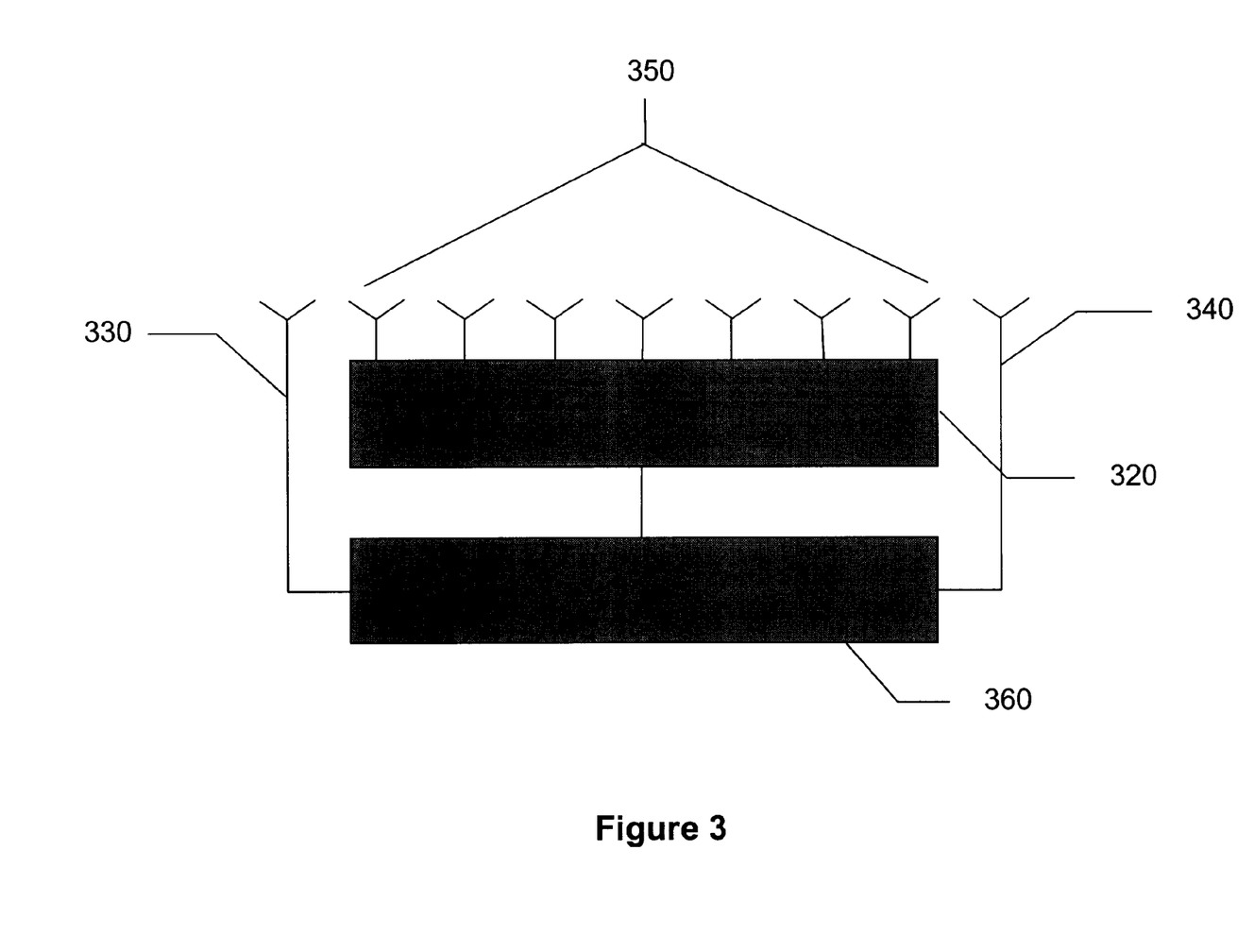
FIG. 3 shows a baseline antenna architecture for spatial-temporal denial.

The baseline antenna architecture for spatial-temporal denial is shown in FIG. 3. In this case, a main antenna 350 is an N-element phased array bracketed by an interferometric spatial-temporal denial pair 330 and 340. Main antenna 350 may take on characteristics other than an array. A classical waveform generation, timing, and control unit 320 drives main antenna 350. Interferometric spatial-temporal denial pair 330, 340 is driven by a separate waveform generation, timing, and control unit 360, which provides for both intra- (i.e., within the pulse) and inter-pulse phase modulation.

Figure 4A:
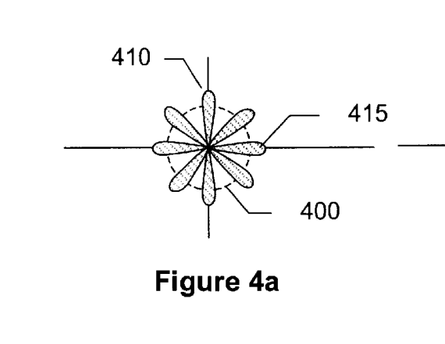
FIG. 4a shows an antenna pattern when two elements are fed in phase.
Figure 4B:
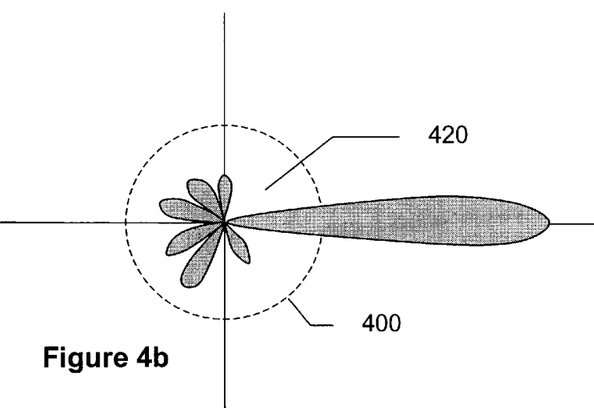
FIG. 4b shows the response of the main antenna of FIG. 3.
Figure 4C:
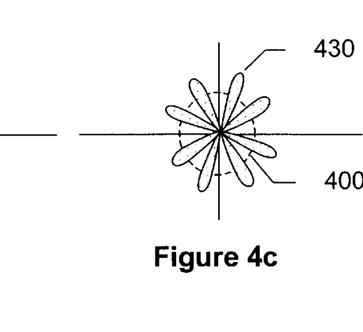
FIG. 4c shows the results of a phase difference (between FIGS. 4a and 4c) applied between a two-element interferometer formed by the two elements shown in FIG. 3.
Figure 4D:
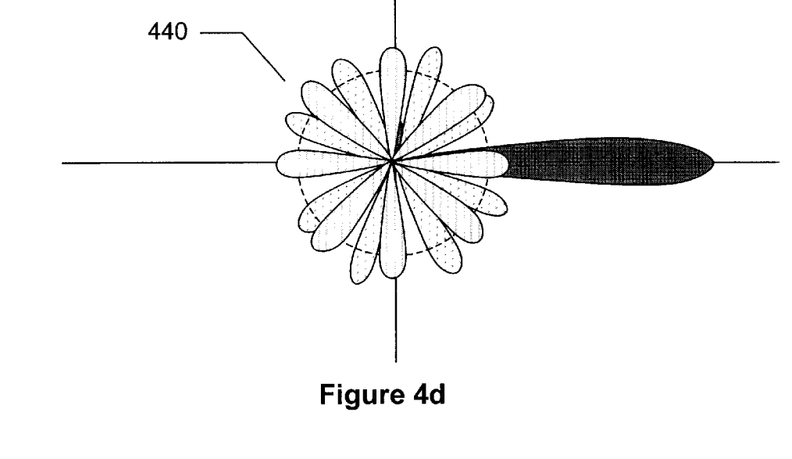
FIG. 4d shows the resultant response using waveform diversity methods.

The change in antenna pattern between FIG. 4a and FIG. 4c shows what happens when a phase difference is applied between the two-element interferometer formed by interferometric spatial-temporal denial pair 330, 340 shown in FIG. 3. FIG. 4a illustrates an antenna pattern 410 when both elements are fed in phase (e.g., on the first pulse). Note that a beam 415 is formed along and broadside to the antenna. Referring to FIG. 4c, when interferometric spatial-temporal denial pair 330, 340 is fed out of phase (e.g., on the second pulse), the antenna pattern rotates and beam 415 becomes a beam 430. When combined with a classical low-sidelobe main antenna with a pattern 420, as shown in FIG. 4b, there results an antenna pattern 440 as shown in FIG. 4d. Referring again to FIG. 3, note that the gain in directivity is determined by main antenna 350 while the sidelobes are dominated by the pattern generated from interferometric spatial-temporal denial pair 330, 340. The interferometric antenna pattern varies according to the phase difference between the two elements of interferometric spatial-temporal denial pair 330, 340, as noted above and shown by antenna pattern 410 and beam 430 in FIGS. 4a and 4b.

Radiating two signals from auxiliary elements at the array's endpoints generates the interferometer pattern. The time waveforms are given by:

$$s_1(t) = a_1(t)\cos(\omega_1 t + \phi_1(t))$$

$$s_2(t) = a_2(t)\cos(\omega_2 t + \phi_2(t))$$

Figure 5A:
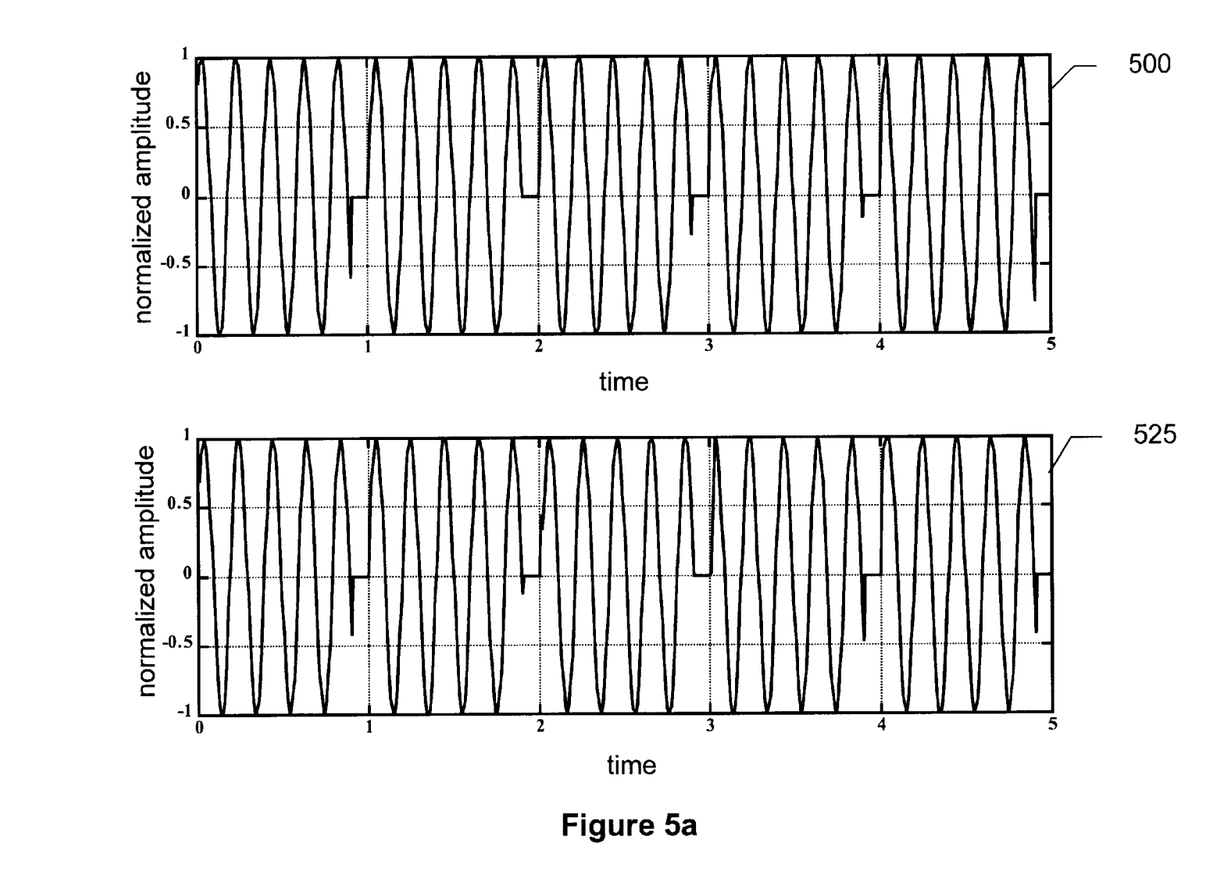
FIG. 5a shows the transmit waveform diversity for an interferometric spatial-temporal denial antenna pair.
Figure 5B:
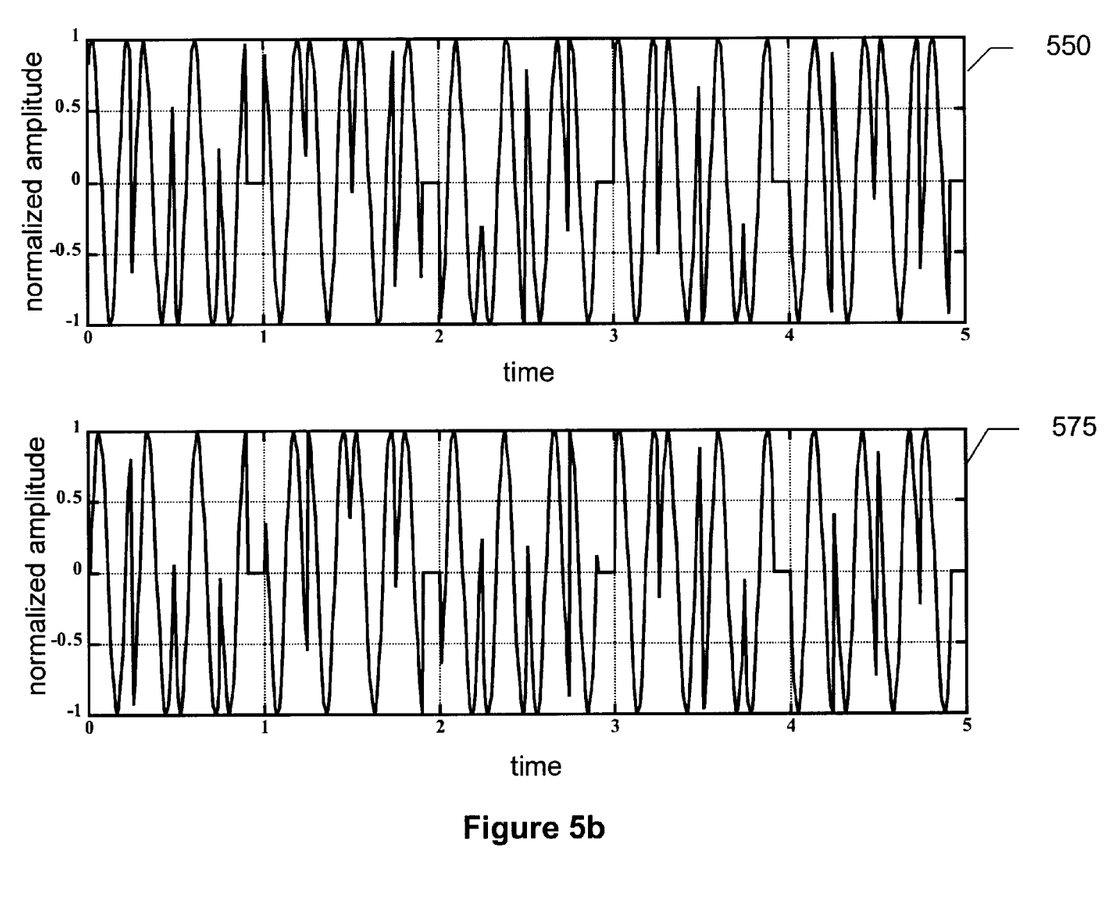
FIG. 5b shows the resultant time response for each element when phase modulation occurs between pulses and also within the pulse period.

In FIG. 5a, $a_1(t)=a_2(t)$, $\omega_1=\omega_2$, and $\phi_1(t)=\phi_2(t)$, which produces the in-phase pattern of FIG. 4a. When $\phi_1(t)=\phi_2(t)+\pi$, the out-of-phase pattern of FIG. 4c is generated. In FIG. 5b, random modulation is illustrated for the general case where $\phi_1(t) \neq \phi_2(t)$.

The angular response pattern as a function of azimuth angle θ, wavelength λ, and element distance of separation d, as illustrated in FIG. 4c, is given by:

$$R(\theta) = |a_1(t)\cos(\omega_1 t + \phi_1(t) - \pi d \cos(\theta)/\lambda) + a_2(t)\cos(\omega_2 t + \phi_2(t) + \pi d \cos(\theta)/\lambda)|$$

In the simplest design, the radiated pulse sequence of only one member of interferometric spatial-temporal denial pair 330, 340 (see FIG. 3) needs to be phase-modulated, with respect to the phase coding of main antenna 350, to achieve spatial-temporal denial of radar and communications systems. This is the baseline approach.

When the radiated waveformns from both members of interferometric spatial-temporal denial pair 330, 340 are phase-modulated with respect to main antenna 350, a further enhancement takes place. FIG. 5a shows the transmit waveform diversity for interferometric spatial-temporal denial antenna pair 330, 340 when both its elements are phase-modulated with uniform random-phase variation, taken ±30 degrees between pulses with respect to the signal reference of main antenna 350. In FIG. 5a the time response of the left element (330) of interferometric spatial-temporal denial pair 330, 340 is shown in a top panel 500; the similar response from the right element (340), in a bottom panel 525. Note that the pulse sequence in top panel 500 that drives the left element exhibits pulse-to-pulse random phase modulation. So does the pulse sequence in bottom panel 525 that drives the right element.

When phase modulation occurs between pulses and also within the pulse period, the resulting time response for each element is shown in FIG. 5b. Again the time response of the left element (330) is shown in a top panel 550; the similar response for the right element (340), in a bottom panel 575. Note that the pulse sequence in top panel 550 drives the left element (330), and the pulse sequence in bottom panel 575 drives the right element (340). Referring again to FIG. 3, the pulse sequences shown in FIG. 5*b* exhibit both intra- and inter-pulse modulation on a pulse-to-pulse basis with reference to main antenna 350.

Figure 6:
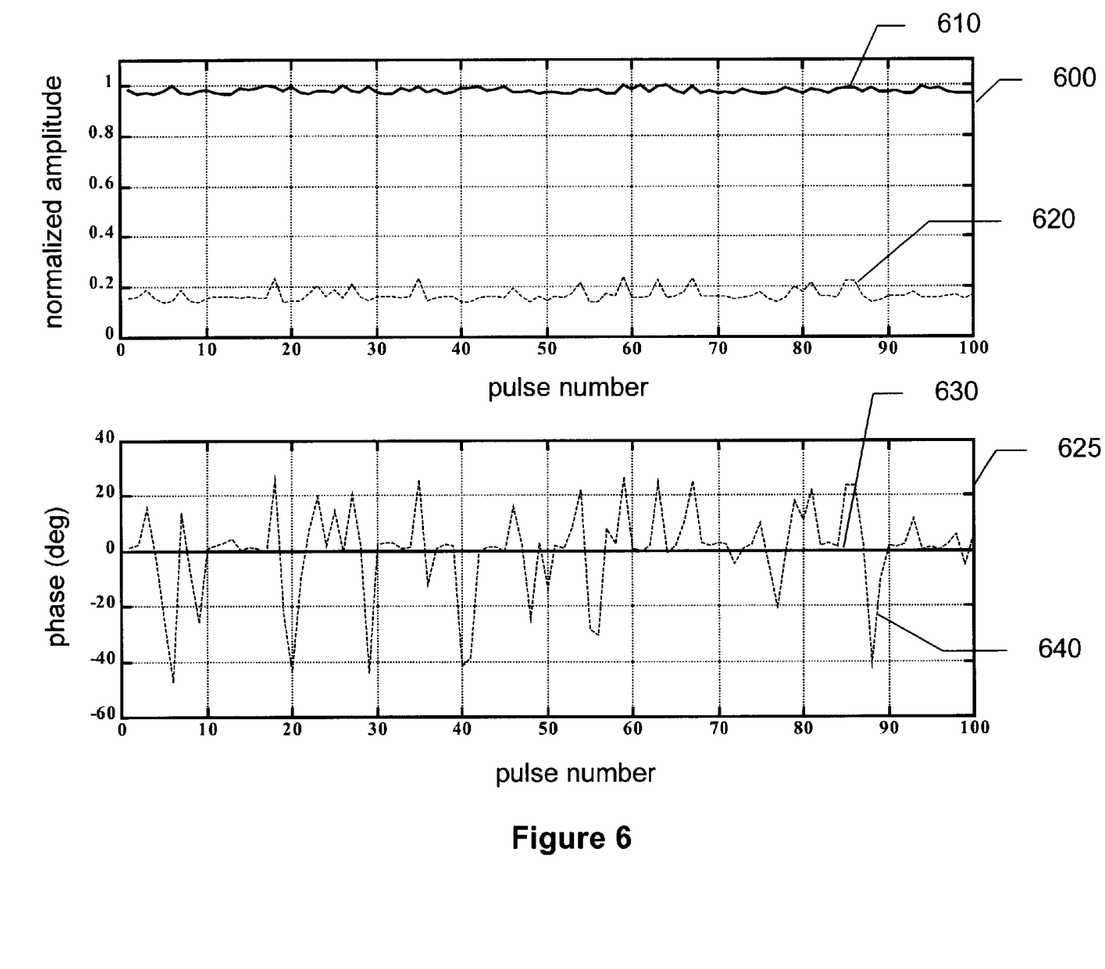
FIG. 6 shows the result of waveform diversity for spatial-temporal denial.

The result of this waveform diversity for spatial-temporal denial is shown in FIG. 6. For illustration a 10-element phased-array main antenna is assumed. The element spacing is taken to be a half wavelength. A distance of six (6) wavelengths bracketing the main antenna separates the elements of interferometric spatial-temporal denial pair 330, 340. A top panel 600 shows the normalized amplitude vs. pulse number. A solid line 610 is the time response observed at main beam signal 110 (broadside) when the two elements of interferometric spatial-temporal denial pair 330, 340 are driven with uniform random inter-pulse phase modulation taken between ±30 degrees. A dotted line 620 in top panel 600 is the subsequent time response of the antenna sidelobe at 30 degrees off boresight. Note that the main beam amplitude stays within ±5 percent of the maximum amplitude. A bottom panel 625 shows the phase in degrees against the pulse number. A solid line 630 in bottom panel 625 is the time response of the main beam when the two elements of interferometric spatial-temporal denial pair 330, 340 are driven with uniform random inter-pulse phase modulation between ±30 degrees. A dotted line 640 in bottom panel 625 shows the subsequent time response of the antenna sidelobe at 30 degrees off boresight. Note that the main beam response of solid line 630 shows negligible phase variation while the phase variation in the sidelobe response of dotted line 640 is extreme. Phase mismatch of the latter varies between −40 and +20 degrees.

Referring again to FIG. 1, this phase mismatch between pulses determines a non-coherent signal behavior, to be observed in the sidelobe of monostatic radar transceiver 100 compared to main beam signal 110. Since non-cooperative bistatic receiver 140 in FIG. 1 must coherently process returns from target 120, a reference signal identical to monostatic main beam signal 110 is required. However, the operation of the present invention has essentially destroyed the ability of non-cooperative bistatic receiver 140 to perform. The present invention has limited sub-clutter visibility to less than 5 dB, where typically a sub-clutter visibility ("SCV") of 40–60 dB is required to detect a target. SCV is a function of the cancellation ratio ("CR"), which determines the degree to which unwanted radar clutter returns can be suppressed. In terms of phase and amplitude error, this function is:

$$CR=(\delta\pi/180)^2+(10^{A/20}-1)^2$$

where δ=phase error in degrees and A=amplitude error in dB. CR is expressed in dB by $CR_{dB}=10\log_{10}(CR)$. A phase error of 32.5 degrees, as shown in FIG. 6, introduced by the present invention, limits non-cooperative bistatic receiver 140 to less than 5 dB SCV. The bistatic receiver will achieve 40 dB SCV only with δ<0.57 deg. and A<0.086 dB and 60 dB SCV only with δ<0.057 deg. and A<0.0086 dB. To achieve high SCV levels for target detection in the presence of strong radar clutter requires either knowing the varying antenna pattern or knowing a priori the coherent reference function.

Figure 7:
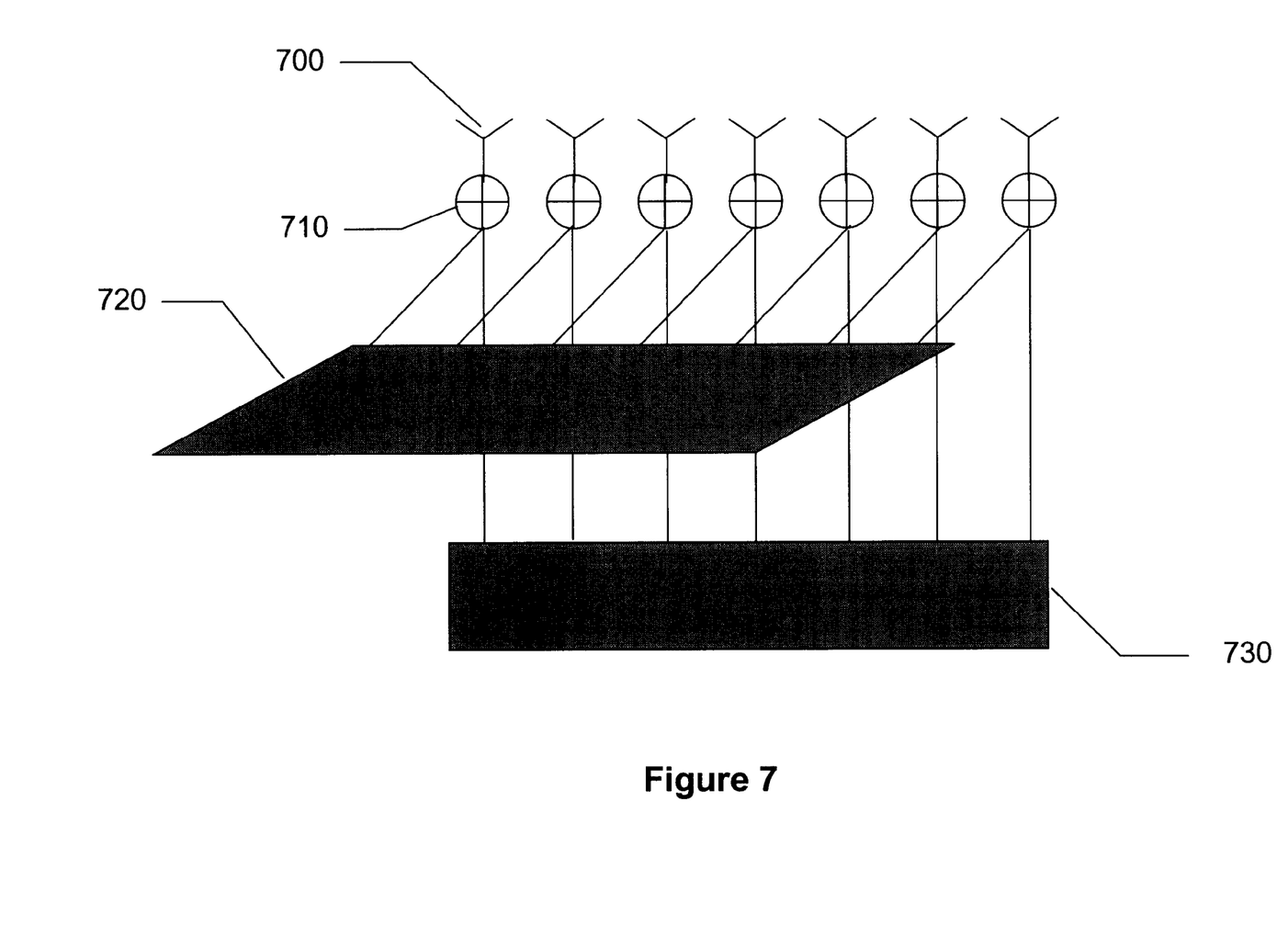
FIG. 7 shows an alternative design that uses a multi-channel phased array with separate multi-channel waveform generation timing and control units for forming the main beam and the spatial-temporal denial sidelobe modulation.

FIG. 7 shows an alternative design that employs a multi-channel phased array 700 with separate multi-channel waveform generation timing and control units to form a main beam 730 and a spatial-temporal denial sidelobe modulation 720. These two signals are summed into a signal 710 and radiated for radar, communications, or precision navigation applications. Additionally, the duty cycle of the spatial-temporal denial waveform may be selected to be higher (up to 100%) in order to prevent non-cooperative bistatic receiver 140 (see FIG. 1) from cohering to dominant main beam 110 scatterers in place of a strong coherent reference signal 150.

Clearly many modifications and variations of the present invention are possible in light of the above teachings. It should therefore be understood that, within the scope of the inventive concept, the invention may be practiced otherwise than as specifically claimed.

What is claimed is:

1. A method of substantially preventing the interception of information associated with radar or communication waveforms that comprise a main signal and a plurality of spatial and temporal sidelobe signals, said method comprising:
    (a) manipulating a spatial waveform to cause spatial sidelobe signals to differ front a mainlobe signal; and
    (b) manipulating a temporal waveform through sidelobe signal time-domain encoding to reduce sidelobe signal signatures.

2. A method of substantially preventing the acquisition and use of radar or communication waveforms that comprise a main signal and a plurality of spatial and temporal sidelobe signals, said method comprising:
    (a) manipulating signatures of said plurality of sidelobe signals through temporal manipulation of waveforms of said plurality of sidelobe signals, thereby causing substantial difficulty in signal acquisition; and
    (b) manipulating information contained within said plurality of sidelobe signals with respect to said main signal through spatial waveform manipulation thereby causing substantial difficulty in signal deciphering.

3. The method of claim 1 wherein said step of manipulating a temporal waveform comprises time domain encoding of said plurality of sidelobe signals emitted from antenna elements carrying said sidelobe signals.

4. The method of claim 1 wherein said step of manipulating a spatial waveform comprises changing the character of information within said plurality of sidelobe signals emitted from auxiliary antenna elements with respect to information emitted by a main antenna carrying said main signal.

5. The method of claim 2 wherein said step of manipulating signatures comprises time-domain encoding of said plurality of sidelobe signals emitted from antenna elements.

6. The method of claim 2 wherein said step of manipulating information comprises changing the character of information contained within said plurality of sidelobe signals emitted from auxiliary antenna elements with respect to information emitted by a main antenna carrying said main signal.

7. Apparatus for denying the acquisition and use of radar or communication waveforms comprising a main signal and a plurality of sidelobe signals, said apparatus comprising a multichannel transmit antenna system that further comprises at least two auxiliary antenna elements carrying spatial-temporal sidelobe information to accompany the transmission of a main antenna carrying said main signal.

8. The apparatus of claim 7 wherein said main antenna is an N-element phased array bracketed by said at least two auxiliary antenna elements.

9. The apparatus of claim 8 wherein said at least two auxiliary antenna elements are each interferometric antennas.

10. The apparatus of claim 7 wherein said at least two auxiliary antenna elements are each interferometric antennas.

11. The apparatus of claim 10 wherein said main antenna is an N-element phased array that is bracketed by said at least two auxiliary antenna elements.

12. The apparatus for claim 7 further comprising a first waveform generation timing and control unit for driving said main antenna.

13. The apparatus of claim 12 further comprising a second waveform generation and control unit for driving said at least two auxiliary antenna elements.

14. The apparatus of claim 7 further comprising:
  (a) a first waveform generation timing and control unit for driving said main antenna; and
  (b) a second waveform generation timing and control unit for driving said at least two auxiliary antenna elements;
  wherein said second waveform generation timing and control unit drives said at least two auxiliary antenna elements with waveform characteristics different from said main antenna, said main antenna being driven independently by said first waveform generation timing and control unit.

15. The apparatus of claim 8 further comprising:
  (a) a first waveform generation timing and control unit for driving said N-element phase array; and
  (b) a second waveform generation timing and control unit for driving said at least two auxiliary antenna elements;
  wherein said second waveform generation timing and control unit drives said at least two antennas with waveform characteristics different from said main antenna, said N-element phase array being driven independently by said first waveform generation timing and control unit.

16. The apparatus of claim 7 wherein waveform manipulation of spatial sidelobes is achieved through changing signal information emitted from said at least two auxiliary antenna elements with respect to information emitted from said main antenna.

17. The apparatus of claim 7 wherein temporal manipulation is achieved through time-domain encoding of signals emitted from said at least two auxiliary antenna elements.

18. The apparatus of claim 15 wherein waveform manipulation of spatial sidelobes is achieved by changing the character of information contained within a plurality of sidelobe signals emitted from said at least two auxiliary antenna elements with respect to information emitted by a main antenna carrying said main signal, and temporal manipulation is achieved by time-domain encoding of signals emitted from said at least two auxiliary antenna elements.

* * * * *